(12) United States Patent
Bryngelson

(10) Patent No.: US 12,611,978 B1
(45) Date of Patent: Apr. 28, 2026

(54) TRANSLUCENT BUNK COVER

(71) Applicant: Damon L. Bryngelson, Owatonna, MN (US)

(72) Inventor: Damon L. Bryngelson, Owatonna, MN (US)

( * ) Notice: Subject to any disclaimer, the term of this patent is extended or adjusted under 35 U.S.C. 154(b) by 384 days.

(21) Appl. No.: 18/501,927

(22) Filed: Nov. 3, 2023

Related U.S. Application Data

(60) Provisional application No. 63/382,290, filed on Nov. 3, 2022.

(51) Int. Cl.
  B60P 3/10 (2006.01)
  B60Q 1/30 (2006.01)

(52) U.S. Cl.
  CPC ............ B60P 3/1033 (2013.01); B60Q 1/305 (2013.01)

(58) Field of Classification Search
  CPC ......... B60P 3/10; B60P 3/1033; B60P 3/1066; B60P 3/1075; B60Q 1/2696; B60Q 1/305
  USPC ...................................... 280/414.1; 296/39.1
  See application file for complete search history.

(56) References Cited

U.S. PATENT DOCUMENTS

| | | | |
|---|---|---|---|
| 4,033,600 | A | 7/1977 | Watson |
| 4,429,893 | A | 2/1984 | Palamara |
| 4,519,738 | A | 5/1985 | Wood |
| 4,715,768 | A | 12/1987 | Capps |
| 5,002,299 | A | 3/1991 | Firehammer et al. |
| 5,060,963 | A | 10/1991 | Godbersen |
| 5,133,570 | A | 7/1992 | Godbersen |
| 5,429,383 | A | 7/1995 | Reed |
| 5,719,552 | A | 2/1998 | Thompson |
| 5,993,063 | A | 11/1999 | Stewart |
| 6,189,909 | B1 | 2/2001 | Danchuk |
| 6,253,699 | B1 | 7/2001 | Arbaugh et al. |
| 6,439,589 | B1 | 8/2002 | Payne |
| 6,453,837 | B1 | 9/2002 | Arbaugh et al. |
| 6,651,997 | B2 | 11/2003 | Higginson |
| D484,086 | S | 12/2003 | Davidson et al. |
| 6,830,410 | B2 | 12/2004 | Davidson et al. |
| 7,017,933 | B2 | 3/2006 | Mickley |
| 7,113,078 | B2 | 9/2006 | Young |

(Continued)

OTHER PUBLICATIONS

Boating Magazine, Gatorbak Clear Trailer Bunk Covers, Jan. 7, 2017. (Year: 2017).*

(Continued)

*Primary Examiner* — Jason S Daniels
(74) *Attorney, Agent, or Firm* — Albert W. Watkins

(57) ABSTRACT

A translucent illuminated bunk cover for a boat trailer comprises a translucent ride pad having a unique optical transmittance curve that is linear across the visible spectrum, resulting in a wavelength neutral gray color. In one embodiment, the bunk cover has an outside leg having a generally planar body and longitudinally extensive ribs; a translucent ride pad having a crest and a plurality of longitudinally extensive ribs; and an inside leg having a generally planar body and longitudinally extensive ribs. In one embodiment, the trailer comprises a wheel set; a lateral framing member; and a pair of bunks extending longitudinally generally parallel with a longitudinal axis of the trailer. A groove is formed within a top surface of each one of the pair of bunks that is visible from above. At least one light source is located within the grooves, and a drain hole is also provided within the grooves.

17 Claims, 2 Drawing Sheets

(56) References Cited

U.S. PATENT DOCUMENTS

| | | | |
|---|---|---|---|
| 7,237,932 | B2 | 7/2007 | Ter-Hovhannissian |
| 7,413,209 | B2 | 8/2008 | Mackarvich |
| 7,581,745 | B2 | 9/2009 | Remedios et al. |
| 7,584,981 | B2 | 9/2009 | Vonderahe et al. |
| 8,388,265 | B2 | 3/2013 | Basta et al. |
| 8,794,870 | B2 | 8/2014 | Basta et al. |
| 9,308,851 | B2 | 4/2016 | Wiegand et al. |
| 9,446,824 | B2 | 9/2016 | Swart |
| 9,555,732 | B2 | 1/2017 | Harms, Jr. et al. |
| 9,744,895 | B2 | 8/2017 | Wiegand et al. |
| 9,771,013 | B1 | 9/2017 | Delanghe et al. |
| 10,011,211 | B1 | 7/2018 | Gutierrez et al. |
| 10,889,239 | B2 | 1/2021 | Washington |
| 11,359,802 | B2 | 6/2022 | Kyle et al. |
| 11,414,003 | B1 | 8/2022 | Reymolds |
| 11,590,883 | B2 | 2/2023 | Ratliff, Sr. |
| 11,603,027 | B1 | 3/2023 | Reynolds |
| 2003/0189836 | A1 | 10/2003 | Sparling et al. |
| 2005/0237755 | A1 | 10/2005 | Vause |
| 2005/0263982 | A1 | 12/2005 | Mickley |
| 2006/0120093 | A1* | 6/2006 | Purdy .................... B60Q 1/305 |
| | | | 362/543 |
| 2009/0174170 | A1* | 7/2009 | Remedios ............. B60P 3/1066 |
| | | | 280/414.1 |
| 2013/0004238 | A1 | 1/2013 | Doig |
| 2015/0061899 | A1 | 3/2015 | Wiegand et al. |
| 2015/0158566 | A1 | 6/2015 | Doig |
| 2016/0090028 | A1 | 3/2016 | Krejei |
| 2016/0207437 | A1 | 7/2016 | Wiegand et al. |
| 2016/0236613 | A1 | 8/2016 | Trier |
| 2016/0264220 | A1 | 9/2016 | Laceky et al. |
| 2016/0288688 | A1 | 10/2016 | Wiegand et al. |
| 2017/0073048 | A1 | 3/2017 | Butcher |
| 2020/0247310 | A1* | 8/2020 | Terry .................... F21S 43/195 |
| 2022/0297595 | A1* | 9/2022 | Ratliff, Sr. ............... F21S 4/28 |

OTHER PUBLICATIONS

"2017 IBEX Innovation Award Winners Announced Honoring Achievement in Product Development for the Marine Industry", IBEX, Tampa, FL, Sep. 19, 2017, 2 pages.

* cited by examiner

TRANSLUCENT BUNK COVER

CROSS REFERENCE TO RELATED APPLICATIONS

The present application claims the benefit of U.S. provisional patent application 63/382,290 filed Nov. 3, 2022 of like title and inventorship, the teachings and entire contents which are incorporated herein by reference.

BACKGROUND OF THE INVENTION

1. Field of the Invention

The present invention pertains generally to boating, and in one more particular manifestation to submersible trailers used to transport marine watercraft into and out of bodies of water. In this manifestation, the present invention provides illuminated trailer bunks having exceptional optical characteristics, vastly simplifying loading a boat onto a submerged trailer while simultaneously improving aesthetic appearance.

2. Description of the Related Art

Boating is a wonderful and widely enjoyed recreational pastime. There are many different recreational activities that people may choose to partake in, ranging from fishing to water skiing to sightseeing or touring, and just enjoying time on the water. In warm weather, time on the water may also be much cooler and more comfortable, owing to the mediating effect the water has on air temperatures.

Boats range in size from the very large ocean liners that are able to withstand the also very large waves of the open ocean, and generally much smaller boats that for the most part are confined to much smaller bodies of water or more sheltered waters. The ocean vessels are designed to spend most of their useful life in the water, with an occasional trip to the shipyard dry docks for repairs, cleaning and the like. In contrast thereto, and of course dependent upon the boat and the body of water, many inland boats spend much of their useful life out of the water. The smaller boats in many cases are transported over the land from a storage location such as in a yard, shed, garage, or the like, to the body of water. The boat will then be unloaded at a boat ramp into the water. The boat may then be used for the day or a few days, before being reloaded onto the trailer and transported back to the storage location.

In some locales, this ability to trailer the boat and move it over the roadways is a highly prized benefit, since there may be many disconnected lakes or rivers in close geographical proximity. By being able to load and unload the boat from a trailer, the boat may be used within any of these different waters, depending upon the desires of the boater on any given day.

As may be appreciated, the repeated unloading and launching, and the subsequent landing and trailering of the boat will most preferably be done quickly and efficiently, but without any risk of harm to the boat. Further, this will preferably be achieved by novices with little or no experience.

Many features have been designed into modern trailers to achieve these objectives. One of these features is the provision of a number of trailer bunks or rollers. In the case of rollers, the rollers allow the boat to contact the roller, and move on the roller relative to the trailer frame without scratching the boat. Unfortunately, these rollers are necessarily relatively small, either requiring many rollers to better support the load of the boat or risking undesirable denting of the hull. In addition, over time one or more of the rollers may bind, and if they do, the boat may still be scratched.

An alternative to rollers are bunks, and in some trailers both bunks and rollers may be used. Bunks are typically long, slender boards, or beams that provide a large distributed contact area for a boat. When fabricated from appropriate materials the boat may be driven onto the trailer when floating in the water, and the trailer will commonly include a winch that is hooked to a hook on the boat. The winch is then turned, drawing the boat entirely onto the trailer, sometimes by sliding the boat along the supporting bunks. The trailer is then pulled from the water, lifting the boat at the same time. Likewise, when the boat is unloaded and launched, the boat may typically be slid off of the bunks and into the water.

In the midday sun, and in a reasonably clear body of water, the boat operator has generally good view of the submerged trailer and so can maneuver the boat into position above the trailer. Then the boat winch can be coupled, and the boat fully loaded onto the trailer. However, when the water is more turbid or when the angle of the sun is too low or there is cloud cover, or most particularly under the cover of darkness, it can be very difficult for the boat operator to determine where the trailer is.

This inability to clearly see the submerged trailer may lead to the boat being positioned incorrectly over the bunks, forcing the boat to be released from the winch and repositioned prior to being winched fully onto the trailer. This extra loading effort is not only undesirably time consuming, in some cases it may be harmful to the boat. Most trailers are configured to match reasonably with the particular boat, meaning the bunks are positioned on the trailer to work cooperatively with and fit with the boat. Unfortunately, when the alignment of the boat is too far off from the trailer, then during a loading attempt there may be undesirable points of excessive force applied to the hull. In addition, the boat may slip off of the trailer, creating very undesirable tilting of the boat and potentially harmful sliding of the boat along just one bunk on one side of the trailer. Consequently, it is desirable to provide a trailer that may be more easily seen by the boat operator, to reduce the risk of harm to the hull and to reduce the chance of unsuccessful loading attempts.

Several artisans have developed apparatus to address at least some of the limitations of the prior art. Exemplary U.S. patents, the teachings which are incorporated herein by reference, include: U.S. Pat. No. 4,715,768 by Capps, entitled "Boat trailer guide"; U.S. Pat. No. 7,017,933 by Mickley, entitled "Lighted guide post assembly for boat trailers"; and U.S. Pat. No. 7,113,078 by Young, entitled "Emergency lights for towed vehicles". Each of these patents provide illumination at the top of a pair of lighted guide posts, one on each side of the trailer. The lights are definitely beneficial in locating the trailer in either muddy water or under the night sky. Nevertheless, the two points of light do not provide good visual indication of the location of the bunks, and a boater may easily misalign the boat away from centered with and parallel to the bunks. Furthermore, these lighted guide posts are undesirable and unnecessary protrusions from an otherwise visually sleek trailer, they add wind resistance when trailering, they can actually interfere with the trailering, and they are inherently weak, meaning they can easily be broken or damaged accidentally.

U.S. Pat. No. 7,581,745 by Remedios et al, entitled "Adjustable aluminum trailer bunk for trailers", the teachings which are incorporated herein by reference, attempts to improve upon this limitation by providing a "glow in the dark additive that causes the protective covering . . . to glow in the dark." While conceptually interesting, this Remedios et al concept is completely useless in practical application for several important reasons. First, the glow in the dark additive requires substantial illumination in order to glow or luminesce. Unfortunately, the utility of the glow is greatest in dark surroundings, and so there is no convenient light source. While the towing vehicle reverse lights will provide some faint glow from the phosphor, the angle of illumination from those reverse lights is nearly parallel to the bunk surfaces, meaning most of the light will be reflected off of the bunk cover surface, and so will be not absorbed by the bunk phosphor. Further, the extreme angle relative to the bunks also reduces the amount of luminance shining on the bunks in the first place. Even if all of this illumination from the reverse lights contacting the bunks were to be received in the phosphor, the luminance emitted by the phosphor is so minor as to have almost no perceptible benefit to a boater. Furthermore, the phosphor can interfere in several important ways with a bunk cover. The phosphor presents a foreign composition that can reduce the desirable characteristics of a polymer, which in the present invention includes both durability and translucency. The phosphor may render the polymer cloudy and slightly yellow, while the chemical composition may adversely impact the useful life and operating characteristics as well.

Another artisan, in U.S. Pat. No. 6,439,589 by Payne, entitled "Trailer step with backlighting", the teachings which are incorporated herein by reference, provides illumination within a side step of the trailer. However, this single side-facing light will provide no benefit during the loading or unloading of a boat from the trailer.

Additional US patents and published patent applications, the relevant teachings which are incorporated herein by reference, include: U.S. Pat. Nos. 7,017,933; 7,581,745; 9,308,851; 9,744,895; 10,011,211; 10,889,239; 11,359,802; 11,414,003; 11,590,883; 11,603,027; 2003/0189836; 2005/0237755; 2009/0174170; 2016/0090028; 2016/0264220; 2016/0288688; and 2017/0073048.

Recognizing the limitations of the prior art, the present inventor has previously introduced a transparent bunk cover into the marketplace that has received many awards and accolades. While overcoming many of the illumination limitations of the prior art in an outstanding way, that bunk cover fails to provide suitable optical characteristics to both meet the illumination requirements and provide a more highly desired aesthetic appearance.

In addition to improving the boater's experience at the time of loading and unloading, it is further desired to provide a bunk cover that may also be installed easily by trailer manufacturers and others seeking to apply a high quality bunk cover to a boat trailer bunk. Such a bunk cover will also preferably complement the color choice of the trailer manufacturer or boat owner. Many prior art trailer bunks are metal or wooden dimensional lumber that is cut to appropriate length, and then covered with a relatively gentler surface such as carpet. However, the carpet is opaque, so the carpet conceals any otherwise desired underlying color, artwork, and illumination. The carpet further tends to hold moisture, which is extremely detrimental to wooden trailer bunks. In addition, the carpet can hold enough water to sustain aquatic pests when a boat operator moves the boat from one lake to another.

To reduce this tendency to hold moisture, the carpet selected is usually relatively thin, tending to wear through quickly while not providing adequate cushioning and protection to the boat hull. In the case of metal bunks, the carpet must be affixed with an adhesive, and over time the adhesive may peel.

Unfortunately, persons owning boat lifts and trailers that have wooden or aluminum bunk supports covered in carpet need to replace the carpet often. The more durable carpets may require less frequent replacement, but as noted above will harbor more water and aquatic pests. In addition, the more durable carpet may also be more difficult to cut, presenting undesirable risk to the installer.

Other materials and geometries have been devised that may be used to fabricate bunk covers having more desirable characteristics than carpet. One such material is an extruded plastic. An exemplary composition is PVC, which is quite tough and abrasion resistant while still presenting a non-marring surface to a boat. This material drains easily when the submersible trailer is removed from the water, so there is no potential harboring of aquatic pests and in the case of a wooden bunk, less exposure to water that may accelerate rotting. Unfortunately, the extrusions of the prior art fail to integrate suitable bunk lighting in combination with a visual appearance that remains excellent whether in daylight, in the dark of night, or when submerged.

As may be apparent, in spite of the advancements and substantial research and development that has been conducted, there still remains a need for an illuminated trailer having improved optical characteristics that both facilitates the loading and unloading of a boat and improves aesthetic appearance.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

The invention is an illuminated bunk cover for a boat trailer. The trailer comprises at least one wheel set; at least one lateral framing member; and at least one bunk extending longitudinally in a direction generally parallel with a longitudinal axis of the trailer. At least one groove is formed within a surface of the at least one bunk that is visible from above. At least one light source is located within the at least one groove, and at least one drain hole is also provided within the at least one groove. The bunk cover comprises an outside leg having a generally planar body and longitudinally extensive ribs; a translucent ride pad having a crest and a plurality of longitudinally extensive ribs; and an inside leg having a generally planar body and longitudinally extensive ribs. The translucent ride pad has a unique optical transmittance curve that is linear across the visible spectrum, resulting in a wavelength neutral gray color.

OBJECTS OF THE INVENTION

Exemplary embodiments of the present invention solve inadequacies of the prior art by providing a translucent synthetic bunk cover that may easily be affixed to bunks of a variety of compositions. A bunk may further be modified by providing at least one longitudinal groove therein into which may be affixed a thin and waterproof LED light strip. The light strip is thus protected from contact with the boat hull through the combination of bunk and bunk cover.

The present invention and has been developed with a number of objectives in mind. While not all of these objectives are found in every embodiment, these objectives nevertheless provide a sense of the general intent and the many possible benefits that are available from embodiments of the present invention.

A first object of the invention is to provide illuminated trailer bunks to submersible trailers used to transport marine watercraft into and out of bodies of water, and thereby vastly simplify loading a boat onto a submerged trailer while simultaneously improving aesthetic appearance. A second object of the invention is to provide good visual indication of the location of the bunks, so that a boater may easily align the boat centered with and parallel to the bunks. Another object of the present invention is to provide a light source that provides self-contained and substantial illumination to have substantial perceptible benefit to a boater. A further object of the invention is to provide a bunk cover free of foreign compositions that can reduce the desirable characteristics of a polymer, which includes durability, resilience, translucency, operating temperature range, and other beneficial operating characteristics. Yet another object of the present invention is to provide a bunk cover that may also be installed easily by boat owners, trailer manufacturers, and others seeking to apply a high quality bunk cover to a boat trailer bunk. An additional object of the invention is to provide a bunk cover that is of a neutral gray color that will expose the color choice of the trailer manufacturer or boat owner. Another object of the invention is the provision of a bunk cover that hides objects and features beneath the translucent bunk cover from view, while still allowing a light source beneath the bunk cover to shine through. An even further object of the invention is the provision of a bunk cover that sheds water and aquatic pests. Another object of the invention is the provision of a geometry that is nearly universal to the different bunk geometries, and so is as easily or in some cases more easily applied to trailers as carpet.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a bunk cover 1 fabricated from a translucent synthetic material. Bunk cover 1 will preferably be used in further combination with one or a plurality of light sources 7 to provide illumination to translucent bunk cover 1. The plurality of light sources 7 may be of any suitable color chosen by a manufacturer or purchaser. As a result, the possibilities for colors and color combinations are unlimited. Translucent bunk cover 1 can be used to create full length, top viewable lighting of one or all bunks 5, in turn vastly simplifying loading a boat onto a submerged trailer while simultaneously improving aesthetic appearance and road safety.

Figures 1, 2:
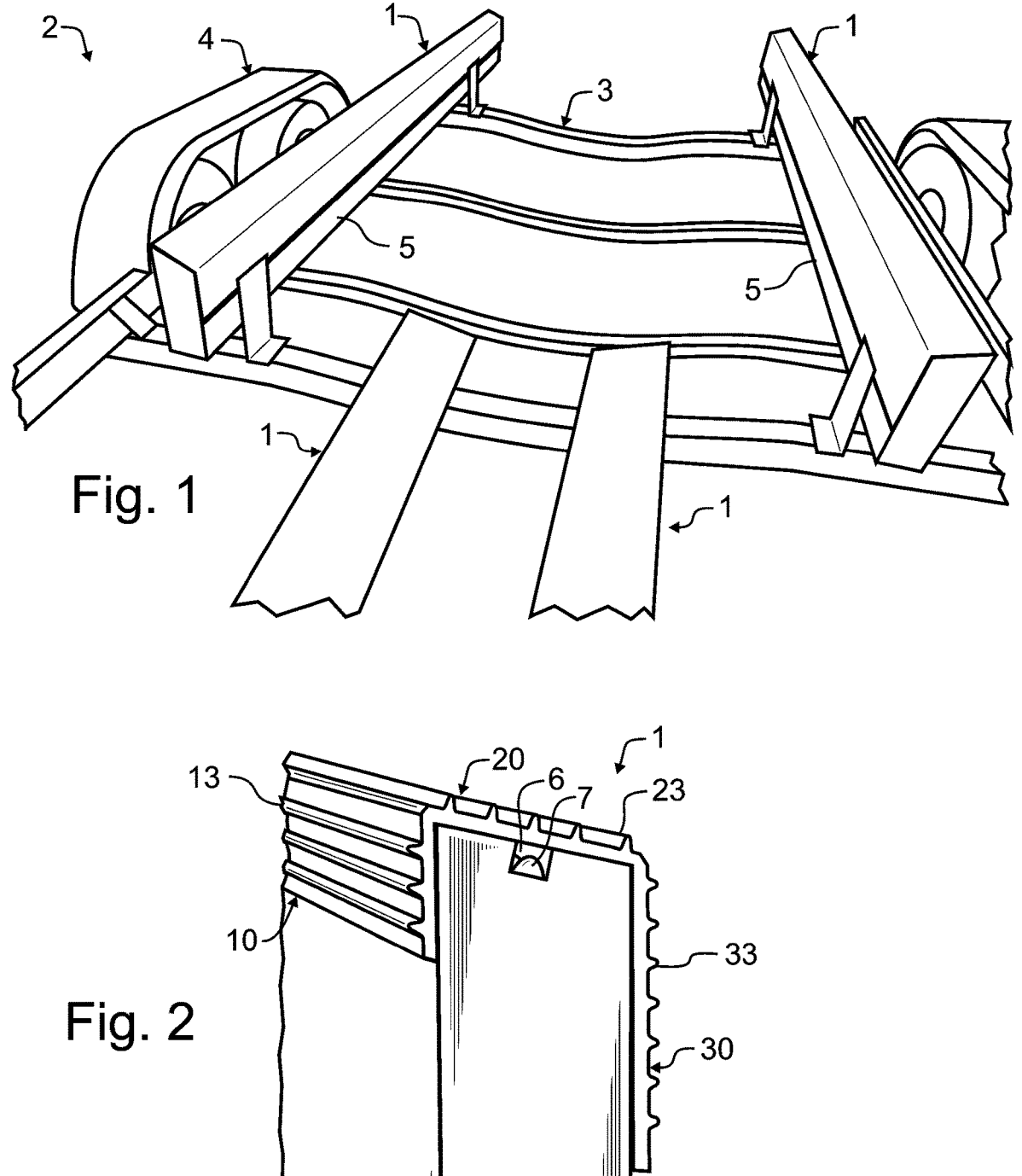
FIG. 1 illustrates a preferred embodiment translucent bunk cover designed in accord with the teachings of the present invention in further combination with a boat trailer from a front perspective view.
FIG. 2 illustrates the preferred embodiment translucent bunk cover and boat trailer bunk of FIG. 1 from an end enlarged perspective view.

In the preferred embodiment of the invention illustrated in FIG. 1, translucent bunk cover 1 is illustrated in combination with a prior art boat trailer 2. While trailer 2 may be of any suitable geometry, as illustrated there are a number of lateral framing members 3 that run transverse to the longitudinal axis of trailer 2. Adjacent to the sides of trailer 2 are wheel sets 4 that may include one or more wheels, as is known in the art. Typically extending parallel to the longitudinal axis of trailer 2, and also typically in pairs, are one or more bunks 5 configured to support a watercraft thereupon. In accord with the teachings of the present invention, one or more of these bunks 5 will most preferably be covered by preferred embodiment translucent bunk cover 1.

Preferred embodiment translucent bunk cover 1 and a bunk 5 are illustrated in further detail in FIG. 2. Translucent bunk cover 1 comprises an outside leg 10, a ride pad 20, and an inside leg 30. Ride pad 20 is preferably somewhat thicker than either of the outside leg 10 and inside leg 30. The increased thickness of ride pad 20 provides improved cushion and durability to the primary contact surface. A plurality of longitudinally extensive ribs 13, 23, and 33 are also optionally provided.

The longitudinal axis of preferred embodiment translucent bunk cover 1 is preferably generally parallel with the longitudinal axis of an associated bunk 5. This means that ribs 13, 23, and 33 are also parallel with the longitudinal axis of an associated bunk 5. This alignment provides several benefits. First, when a boat is being loaded or launched, the boat will primarily move along an axis also generally parallel to the longitudinal axis of trailer 2. Since ribs 13, 23, and 33 run parallel, the ribs will actually help to keep the boat moving parallel therewith, and will help to resist movement transverse to trailer 2. In addition, as trailer 2 is removed from a body of water, which involves pulling the trailer out of the water at an angle shifted slightly vertically, any water that has collected on preferred embodiment translucent bunk cover 1 will drain off longitudinally to the back of the trailer, flowing between adjacent ribs. Noteworthy here is that when the boat has been loaded it will not interfere with longitudinal drainage between ribs 13, 23, and 33, but could interfere with transverse drainage.

One or more longitudinal grooves 6 are preferably provided in each associated bunk 5. As illustrated in FIG. 2, one or a plurality of light sources 7 are preferably provided in each groove 6. For the purposes of the present invention, the particular type of light source is not critical to the present invention, and so may include incandescent, fluorescent, electroluminescent, and LED light sources. However, LED light sources are particularly efficient at converting electricity to light, and these LED light sources operate at quite low voltage. The efficiency may be important and desirable to prevent or reduce the likelihood of undesirable excessive temperatures within groove 6. A low voltage light source is preferable both because of the availability of a low voltage electrical supply already used to illuminate the standard trailer lighting, and owing to the increased safety to persons exposed to a lower voltage. In addition, and for exemplary and non-limiting purpose, in various alternative embodiments an LED light strip may be adhesively affixed within groove 6, potted therein using one of a variety of well-known potting compositions, or simply press-fit and retained through mechanical friction with groove 6.

Suitable electrical connection into trailer wiring or other suitable source of electrical power is provided to light sources 7. Noteworthy here is the fact that the electrical power may either be provided simultaneously with running lights, or may in alternative embodiments be selectively applied through separate switch or control.

As illustrated in the Figures, illumination from light sources 7 within grooves 6 is only provided through ride pad 20. However, in alternative embodiments grooves 6 may optionally be provided in other orientations as well. In such alternative embodiments, illumination from light sources 7 may then also or alternatively pass through either outside leg 10 or inside leg 30.

In a preferred embodiment, light sources 7 are intrinsically waterproof, thereby eliminating the need for potting composition. If necessary to cut light sources 7 to a particular length, and if such a cut would otherwise render light sources 7 to be less than waterproof, then suitable sealant, a potting compound, or a mechanical or chemical equivalent to a sealant or potting compound will preferably be applied at the cut location to preserve the waterproof nature of light sources 7.

One or more drain holes 8 may be provided within each associated bunk 5. Each drain hole will preferably be sized and located to pass from a portion of groove 6 to a lower exterior of bunk 5, to allow gravity draining of any water collected within groove 6. This can be accomplished by forming the drain hole to have a diameter greater than the width of light sources 7, or by accessing groove 6 from an angle or region not covered by light sources 7. While the provision of drain holes is optional, such provision helps to ensure that water does not accumulate within grooves 6. Accumulated water may not only accelerate rot in a wooden bunk 5 or corrosion in a metal bunk 5, but such water may also undesirably transport aquatic pests, whether animals or vegetative, from one water body to another. Nevertheless, grooves 6 may also remain open at one or both ends of bunk 5 and in such case may alternatively drain through a longitudinal end.

When preferred embodiment translucent bunk cover 1 is fabricated from a translucent composition, then the light emanating from these light sources 7 will be visible to a person, particularly in conditions of low ambient light or when the trailer is submerged and the water is more turbid. As a result of this illumination, a boat operator will more clearly see the submerged trailer bunks, and may then better align the boat correctly over the bunks. This both saves time and reduces the chance of harming the boat during loading.

In addition to assisting with loading the boat, light sources 7 also illuminate the bottom of the boat once the boat is loaded onto the trailer. This facilitates the inspection of the boat in those same low ambient light conditions, which can be vital where particular water bodies are known to contain invasive species, and a boat operator wishes to move from this contaminated water body to an uncontaminated water body either prior to sunrise or subsequent to sunset. The illuminated boat hull is also more visible during transport during the dark, increasing the chance that cross-traffic will see the trailer and boat.

While illumination emanating from light sources 7 is highly beneficial and can be extremely aesthetically pleasing, illumination from external sources such as daylight can highlight or emphasize undesirable features or characteristics. For exemplary and non-limiting purpose, as the bulk material and finish of bunk 5 ages, it may discolor. Paint and finish may peel. Similarly, the lighting wiring and strips detract from the overall fit and finish of trailer 2.

Figure 3:
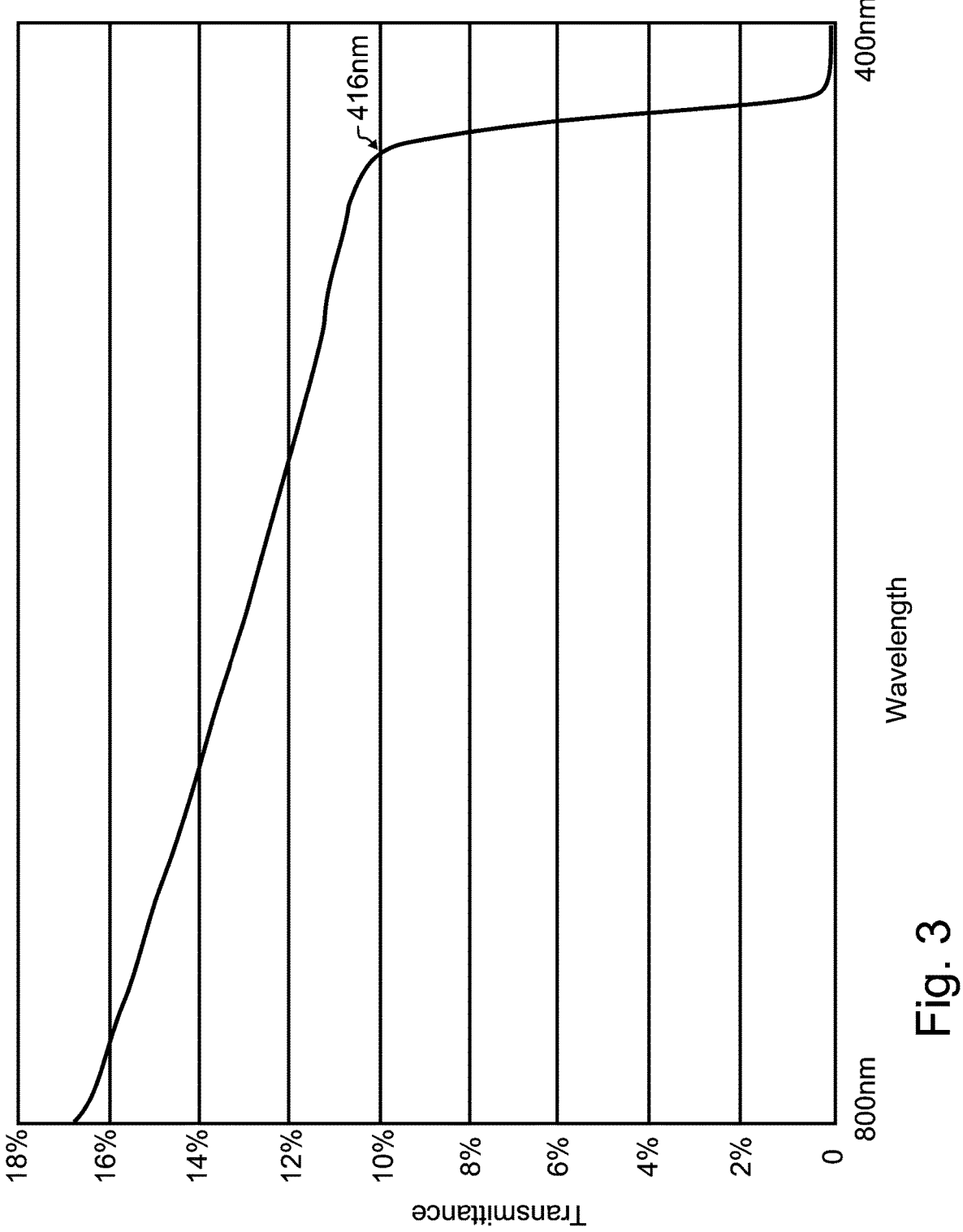
FIG. 3 graphically illustrates the transmittance of the preferred embodiment translucent bunk cover of FIG. 1 at various light wavelengths.

In consideration thereof, and in accord with the teachings of the present invention, preferred embodiment translucent bunk cover 1 is colored with a linear transmittance curve across the visible spectrum illustrated in FIG. 3, resulting in a wavelength neutral gray color. For the purposes of the present disclosure, the visible spectrum is defined herein as light having a wavelength within the range of 420-750 nanometers (nm). Those familiar with the wavelengths of light visible to humans will recognize that the visible spectrum as defined herein ranges from blue light to red light and includes the full spectrum of colors between. A linear transmittance curve provides a color neutral output that does not have material transmittance peaks that would shift the apparent color toward that of the peak, and likewise does not have material transmittance valleys that would also result in an apparent color. Gray coordinates with essentially any colors and color schemes within a color palette, allowing a manufacturer to use a single preferred embodiment translucent bunk cover 1 regardless of the color scheme chosen by a customer for a trailer 2.

The graph of FIG. 3 plots the percentage transmittance of light through preferred embodiment translucent bunk cover 1 along the vertical or Y-axis against the wavelength of light measured in nanometers (nm). As may be recognized from the plot, preferred embodiment translucent bunk cover 1 ranges in transmittance from 10% at 416 nm to 15.6% at 750 nm, with a substantially linear plot therebetween. This combination allows lights of any color or plurality of colors to emit and pass through preferred embodiment translucent bunk cover 1, without perceptible color distortion. However, light coming from an exterior source and passing through the least degrading path, which would be the shortest path passing directly through the thickness, would be diminished not only to the same 10% to 15.6%, but then would be further diminished by an amount lost while reflecting from the underlying object such as bunk 5. For exemplary purpose only, and knowing that different materials have greater or lesser reflectance, half of the light will be presumed to be absorbed rather than reflected from the underlying object. This leaves the reflected portion at 5-7.8% of the original light. This reflected light must then pass back out of preferred embodiment translucent bunk cover 1. Once again presuming the greatest transmission possible, which again occurs when the light takes the shortest path passing directly through the thickness of preferred embodiment translucent bunk cover 1, then once again only 10% to 15.6% of the reflected light will pass through. This brings the amount of light passing inward through preferred embodiment translucent bunk cover 1 in the shortest path, being reflected back outward, and passing outward through preferred embodiment translucent bunk cover 1 to only 0.5-1.2% of the light originally incident on preferred embodiment translucent bunk cover 1. In essentially all cases, this small amount of light that makes it into and back out of preferred embodiment translucent bunk cover 1 is less than the amount of light that is reflected directly off of the exterior surface of the bunk cover. As a result, the transmittance is low enough that preferred embodiment translucent bunk cover 1 will appear to be a dark opaque gray when illuminated by an exterior light source, and features underneath preferred embodiment translucent bunk cover 1 will not be visible.

Nevertheless, when the light originates or emanates from one or more light sources 7 interior to preferred embodiment translucent bunk cover 1, 10% to 15.6% will pass through and be visible from the exterior. In such case, and as long as the reflectivity of preferred embodiment translucent bunk cover 1 is relatively low, an exterior light source will need to be at least as intense as the light sources 7 to interfere with a person observing the light emanating from preferred embodiment translucent bunk cover 1. Consequently, in most situations and environments other than extremely bright lighting or intense sunshine viewed from the wrong angle, the illumination originating from light sources 7 underneath preferred embodiment translucent bunk cover 1 will be visible, but the paint, coloring, or other decoration of bunks 5 and other objects will not be visible when only externally illuminated.

While the transmittance of the most preferred embodiment translucent bunk cover 1 is within the illustrated 10% to 15.6% range within the visible spectrum as defined herein above, in alternative embodiments the transmittance is increased. In some preferred alternative embodiments, the transmittance is increased to approximately 20%. Higher transmittance allows illumination originating from one or more light sources 7 to appear brighter compared to an exterior source, meaning the light from the one or more light sources 7 will be brighter and more visible in an environment with more intense external illumination. However, the higher transmittance will also allow more light to pass both directions through preferred embodiment translucent bunk cover 1. In yet further less preferred alternative embodiments, the transmittance is increased to approximately 30%. At such levels, reflections from objects underneath preferred embodiment translucent bunk cover 1 may in some circumstances start to become visible. In some preferred alternative embodiments, the transmittance is decreased to less than 10%. While such lower transmittance does not reveal features hidden behind the bunk, and so may be used in alternative embodiments, the reduced transmittance below a 10% requires greater luminance from the light sources such as LEDs, thereby increasing cost and power consumption without providing material benefit to hiding features. Consequently, and as noted above, the illustrated 10% to 15.6% range within the visible spectrum is most preferred.

In addition to transmitting light from a light source 7, a carefully selected translucent composition having light transmission characteristics taught by the present invention and as illustrated in FIG. 3 is color neutral, which allows a trailer manufacturer or owner an unlimited number of color options, while only requiring the production and inventorying of a single preferred embodiment translucent bunk cover 1. As noted, the relatively linear transmittance across the visible spectrum generates the most preferred neutral grey. In less preferred alternative embodiments, other transmittance curves may be defined that transmit light of different wavelengths significantly better than at other wavelengths, which in turn gives the translucent bunk a distinct color. Nevertheless, and even with these less preferred alternative embodiments that are distinctly colored, the light transmittance will most preferably still stay within the ranges outlined herein above to conceal features beneath or behind the translucent bunk. The selection of suitable colorants is known in the art of PVC and related plastics, and will be made by those skilled in the art upon a reading of the present disclosure and with considerations of the requirements for a trailer bunk and for the manufacture thereof as described throughout the present specification.

In some alternative embodiments, light diffusion elements or ingredients are incorporated into the bunk composition. Such light diffusion elements or ingredients if appropriately selected will be used to improve the hiding of features behind bunk cover 1, while allowing a higher light transmittance percentage. Nevertheless, the selection and quantity of such ingredients will most preferably involve the considerations of the requirements for a trailer bunk and for the manufacture thereof as described throughout the present specification.

In alternative embodiments, various portions of bunk cover 1 may be fabricated from diverse compositions, such as through a co-extrusion process. In such embodiments, one or more of ride pad 20 and legs 10, 30 or portions thereof may be fabricated to be the only translucent portions of bunk cover 1. However, in the preferred embodiment it is also preferred that the entirety of bunk cover 1 be translucent.

One suitable material suitable for use in the fabrication of preferred embodiment translucent bunk cover 1 is a Shore A 80 to 90 flexible synthetic PVC plastic containing UV protectant and antifungal additives. By thermally extruding this material, all surfaces are smooth and non-porous to drain water quickly. The PVC yields a highly durable and resilient product that cushions the watercraft that rests on it, and provides superior protection against scuffs and dents.

Because the preferred embodiment translucent bunk cover 1 is non porous, it will not harbor or sustain aquatic seeds, eggs, or pests. The ribbed but otherwise smooth surface is much more easily cleaned than prior art carpeting. In summary then, the preferred embodiment translucent bunk cover 1 is thicker than carpet in the critical ride pad area, is water tight and rubbery, and will last longer than carpet, all without holding water, meaning it requires less maintenance, provides better protection, and is more aquatically friendly.

In addition to boat trailer bunks, preferred embodiment translucent bunk cover 1 may be used on other frames that it will fit, and so may in some instances provide protection to boat lifts, docks, door frames, fences, equipment trailers, parking bumpers, and other objects that need or require a protective edge.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a translucent bunk cover and a boat trailer, said boat trailer comprising:

at least one wheel set;

at least one lateral framing member;

at least one bunk extending longitudinally in a direction generally parallel with a longitudinal axis of said boat trailer; and at least one light source configured to emit light that is affixed with said at least one bunk; said translucent bunk cover covering the affixed at least one light source; and said translucent bunk cover having a transmittance curve between 10% and 30% across the visible spectrum.

2. The combination illuminated bunk cover and trailer of claim 1, wherein said translucent bunk cover has a linear transmittance curve across the visible spectrum.

3. The combination illuminated bunk cover and trailer of claim 2, wherein said translucent bunk cover has a wavelength neutral gray color.

4. The combination illuminated bunk cover and trailer of claim 1, wherein said translucent bunk cover has a light transmittance low enough that a human eye cannot identify any of a structure of said at least one bunk through said translucent bunk cover; and wherein said translucent bunk cover has a light transmittance high enough that said at least one light source will emit said light visible and distinguishable to said human eye.

5. The combination illuminated bunk cover and trailer of claim 1, wherein said at least one light source further comprises an LED strip.

6. The combination illuminated bunk cover and trailer of claim 5, wherein said LED strip further comprises a waterproof strip.

7. The combination illuminated bunk cover and trailer of claim 5, wherein said at least one bunk comprises at least one groove formed within a surface of said at least one bunk that is visible from above said at least one bunk.

8. The combination illuminated bunk cover and trailer of claim 7, further comprising at least one drain hole within said at least one groove.

9. A boat trailer bunk cover, comprising a translucent ride pad which is configured to support and protect a boat while it is transported on a trailer, said boat trailer bunk cover having a light transmittance curve between 10% and 30% across the visible spectrum.

10. The bunk cover of claim 9, wherein said translucent ride pad has a light transmittance curve between 10% and 20% across the visible spectrum.

11. The bunk cover of claim 10, wherein said translucent ride pad has a light transmittance curve between 10% and 15.6% across the visible spectrum.

12. In combination, a translucent bunk cover and trailer bunk, said trailer bunk comprising:

an affixed light source;

said translucent bunk cover comprising:

a translucent ride pad providing a light transmission level low enough that a human eye cannot identify any of the internal structure of the bunk, and providing a light transmission level high enough that the embedded light source will clearly transmit the guiding lights embedded therein to said human eye;

said translucent ride pad covering said affixed light source, wherein said translucent ride pad has a transmittance curve between 10% and 30% across the visible spectrum.

13. The combination translucent bunk cover and trailer bunk of claim 12, wherein said translucent ride pad has a transmittance curve between 10% and 20% across the visible spectrum.

14. The combination translucent bunk cover and trailer bunk of claim 13, wherein said translucent ride pad has a transmittance curve between 10% and 15.6% across the visible spectrum.

15. The combination translucent bunk cover and trailer bunk of claim 12, further comprising at least one groove formed within a surface of said trailer bunk that is visible from above said trailer bunk.

16. The combination bunk cover and trailer bunk of claim 12, further comprising at least one light source within said at least one groove.

17. The combination bunk cover and trailer bunk of claim 15, further comprising at least one drain hole within said at least one groove.

* * * * *